US012692081B2

(12) United States Patent
Nannetti

(10) Patent No.: US 12,692,081 B2
(45) Date of Patent: Jul. 28, 2026

(54) REMOVABLE HOOKING SYSTEM FOR REMOVABLY HOOKING A PRODUCT SUPPORT ELEMENT TO A CLOSED LOOP CONVEYOR MEANS

(71) Applicant: MARCHESINI GROUP S.P.A., Pianoro (IT)

(72) Inventor: Simone Nannetti, Grizzana Morandi (IT)

(73) Assignee: MARCHESINI GROUP S.P.A., Pianoro (IT)

( * ) Notice: Subject to any disclaimer, the term of this patent is extended or adjusted under 35 U.S.C. 154(b) by 95 days.

(21) Appl. No.: 18/862,557

(22) PCT Filed: Apr. 28, 2023

(86) PCT No.: PCT/IB2023/054468
§ 371 (c)(1),
(2) Date: Nov. 4, 2024

(87) PCT Pub. No.: WO2023/214277
PCT Pub. Date: Nov. 9, 2023

(65) Prior Publication Data
US 2025/0282554 A1     Sep. 11, 2025

(30) Foreign Application Priority Data

May 4, 2022     (IT) ........................ 102022000009014

(51) Int. Cl.
B65G 17/12          (2006.01)
B65G 17/44          (2006.01)
(52) U.S. Cl.
CPC ............. B65G 17/12 (2013.01); B65G 17/44 (2013.01)
(58) Field of Classification Search
CPC ................................ B65G 17/12; B65G 17/44
(Continued)

(56) References Cited

U.S. PATENT DOCUMENTS

| | | | |
|---|---|---|---|
| 6,173,769 B1 | 1/2001 | Goode | |
| 7,641,045 B2 * | 1/2010 | Ishikawa | ................ B65G 17/44 |
| | | | 198/867.14 |
| 2005/0077153 A1 | 4/2005 | Krischer | |

FOREIGN PATENT DOCUMENTS

| | | |
|---|---|---|
| CN | 211944964 | 11/2020 |
| NL | 2008431 | 9/2013 |
| WO | 2009062328 | 5/2009 |

OTHER PUBLICATIONS

WO2011138607 (Year: 2011).*

(Continued)

*Primary Examiner* — Gene O Crawford
*Assistant Examiner* — Lester III Rushin
(74) *Attorney, Agent, or Firm* — JCIPRNET

(57)          ABSTRACT

A removable hooking system of a product support element to a closed loop conveyor means, comprising: a base component, inferiorly having, a housing for accommodating a portion of a closed loop conveyor means for fixing to the conveyor means; a product support element destined to be hooked to the base component inferiorly conformed in such a way as to comprise a first recess and a second recess; a single hooking component positionable in a seat superiorly conformed by the base component. An edge of a wall of the seat is conformed in such a way as to form a first coupling profile complementary to the first recess, and an edge of the first part of the single hooking component is conformed in such a way as to form a second coupling profile complementary to the second recess. The single hooking component comprises a second part that is elastically deformable and has shape memory, which can be compressed so as to near the second coupling profile to the first coupling profile and to enable the hooking of the support element on the base component.

6 Claims, 4 Drawing Sheets

(58) Field of Classification Search
USPC ......................................................... 198/618
See application file for complete search history.

(56) References Cited

OTHER PUBLICATIONS

RU166119 (Year: 2016).*
CA3074928 (Year: 2024).*
"International Search Report (Form PCT/ISA/210) of PCT/IB2023/054468", mailed on Sep. 8, 2023, pp. 1-3.
"Written Opinion of the International Searching Authority (Form PCT/ISA/237) of PCT/IB2023/054468", mailed on Sep. 8, 2023, pp. 1-8.

* cited by examiner (a)

(b)

(c)

REMOVABLE HOOKING SYSTEM FOR REMOVABLY HOOKING A PRODUCT SUPPORT ELEMENT TO A CLOSED LOOP CONVEYOR MEANS

CROSS-REFERENCE TO RELATED APPLICATION

This application is a 371 application of the International PCT application serial no. PCT/IB2023/054468, filed on Apr. 28, 2023, which claims the priority benefits of Italy Patent Application No. 102022000009014, filed on May 4, 2022. Each of the entirety of the above-mentioned patent applications is hereby incorporated by reference herein and made a part of this specification.

FIELD OF THE INVENTION

The present invention relates to the special technical sector relating to product transport devices which use a closed loop conveyor means, such as for example a cogged belt.

DESCRIPTION OF THE PRIOR ART

In these transport devices, for the support of the products which are to be transported and transferred at various operating positions or stations, format-sized support elements are used, called "drawers", which are fixed and coupled to the closed loop conveyor means.

For example, the support elements can include a support surface of the product and lateral walls for containment of the product: the support elements can also possibly include coupling elements with the product to be transported.

Usually, the support elements have to be able to be fixed and hooked to the conveyor means in a removable way, to enable replacement thereof on change of size or type of products which are to be transported.

In particular, the present invention concerns a removable hooking system for hooking a removable product support element to a closed loop conveyor means, such as for example a cogged belt or a belt.

FIG. 1A illustrates a closed loop conveyor means (T), such as for example a cogged belt, which is used for transport of products using support elements (S) of the drawer type.

Also in FIG. 1A, in the left part of the figure, a hooking system (90) of the prior art is illustrated for removably hooking a support element (S) to a portion of the closed loop conveyor means (T).

FIG. 1B illustrates a view in transversal section of the hooking system (90) of the prior art of FIG. 1A made at the support element (S) hooked to the hooking system.

FIG. 2 instead illustrates, in an exploded view, the components of the hooking system (90) of the prior art of FIGS. 1A and 1B.

This hooking system (90) comprises a base component (91) which is U-shaped and thus comprises a main body (92) and two lateral arms (93, 94), which are projecting inferiorly and laterally to the main body (92), and which are arranged and configured in such a way as to define, between them and the lower part of the main body (92), a housing (95) which enables the base component (91) to be positioned at a portion (T1) of the conveyor means (T) and enable the relative fixing.

For example, when the conveyor means (T) is constituted by a cogged belt as illustrated in FIG. 1A, the base component (91) is positioned in such a way that the housing (95) internally houses an upper portion (T1) of the cogged belt in such a way that the base component (91) can be fixed to the cogged belt by means of fastening means, such as for example screws or bolts.

Further, at the portions of the internal walls of the two lateral arms (93, 94) of the base component (91), grooves (9) are present having a suitable shape for coupling with the sliding guides (G) which are associated to the conveyor means (T), so as to guide the base component (91), and thus guide and maintain stable the support element (S) during the activation of the conveyor means (T).

This hooking system (90) further comprises and auxiliary component (80), which is fixable, for example using screws, superiorly of the base component (91).

The auxiliary component (80) is conformed in such a way as to have a seat (81) for the positioning of a hooking component (70).

The seat (81) is conformed in such a way as to be delimited by three lateral walls (82, 83, 84) of containment and to have an open side (85).

The hooking component (70) is couplable to the auxiliary component (80), once inserted in the seat (81) of the auxiliary component (80) through the open side (85) of the seat (81), with the interposing of springs (71).

In particular, the auxiliary component (80) comprises, at a first transversal lateral wall (82) which delimits the seat (81), opposite the open side (85) of the seat (81), respective first holes (F) in which first ends of the springs (71) are inserted, while the second ends of the springs (71) are in contact with a wall (72) of the hooking component (70).

In this way, the springs (71) maintain the hooking component (70) in a first distanced rest position (A) with respect to the first transversal lateral wall (82) of the seat (81) of the auxiliary component (80) in which the hooking component (70) is positioned (as for example illustrated on the left side in FIG. 1A).

The auxiliary component (80) is also conformed in such a way as to comprise a lateral edge (86), parallel to the first transversal lateral wall (82) of the seat (81), which is profiled in an inclined way to form a first inclined coupling profile (P1), substantially having a flared shape and which shape is complementary with respect to a first recess (S1) present inferiorly to the support element (S) which is to be hooked to the base component (91) in order to be coupled to the conveyor means (T).

In turn, the hooking component (70) is conformed in such a way as to comprise a respective lateral edge (73), parallel to the wall (72) on which the springs (71) act, which is profiled in such a way as to form a second inclined coupling profile (P2), having substantially a flared shape, which is complementary with respect to a second recess (S2) present inferiorly of the support element (S), and parallel to the first recess (S1).

The springs (71) are configured to maintain the hooking component (70) in the first distanced rest position (A) so that the second coupling profile (P2) present in the hooking component (70) is at a distance, with respect to the first coupling profile (P1) present in the auxiliary component (80), which is greater than the distance between the first recess (S1) and the second recess (S2) present inferiorly of the support element (S).

In this way, once the base component (91) has been coupled and fixed to a portion (T1) of the conveyor means (T), so as to hook the support element (S) to the base component (91), and therefore hook the support element (S) to the conveyor means (T), it is necessary to push and translate the hook element (70), against the action of the springs (71), towards the first transversal lateral wall (82) of the seat (81) of the auxiliary component (80), until placing it in a position such that the second coupling profile (P2) of the hooking component (70) is at a distance from the first coupling profile (P1) of the auxiliary component (80) which is smaller than the distance between the first recess (S1) and the second recess (S2) present in the support element (S).

Therefore, it is possible to position the support element (S) above, and laterally to, the hook element (70) and the auxiliary element (80) so that an initial part of the first recess (S1) couples with a respective initial part of the first coupling profile (P1) of the auxiliary element (80), then proceeding to release the hook element (70) so that the recall action of the springs (71) pushes the hook element (70) towards the first distanced rest position (A) until an initial part of the second inclined coupling profile (P2) of the hook element (70) couples with an initial part of the second recess (S2) present in the support element (S).

Thereafter the support element can be translated to centre it with respect to the base component (see FIG. 1B or the right part of FIG. 1A).

In order to remove the support element (S), it will be sufficient to translate it transversally to the base component (91), i.e. in a transversal direction to the springs (71), causing the two coupling profiles (P1, P2) to slide with respect to the two recesses (S1, S2) until disengaging the support element (S) from the hooking component (70) and from the auxiliary element (80); the hooking component (70) will be returned to the first distanced rest position (A) by the action of the springs (71).

Further, in order to maintain the hooking component (70) aligned with respect to the auxiliary component (80) during movement thereof for the hooking of the support element (S), a guide peg (75) is present, having a cylindrical shape, which is inserted by a first end into a hole (F1) present in the wall (72) of the hook element (70) on which the springs (71) act, and which is inserted by a second end into a second hole (F2) present in the first transversal lateral wall (82) of the seat (81) of the auxiliary component (80).

A hooking system (90) of this type requires the use of various components which have to interact with one another, such as the auxiliary component (80), the hooking component (70), the springs (71), the peg (75), in order to realise the removable hook of the support element (S) to the base component (91), once the base component has been fixed to the conveyor means (T).

Further, the springs can lose their efficiency or become damaged.

SUMMARY OF THE INVENTION

The aim of the present invention is therefore to describe a new removable hooking system for removably hooking a product support element to a closed loop conveyor means which is able to obviate the drawbacks present in the prior art.

In particular, the aim of the present invention is to describe a novel removable hooking system comprising a minimum number of components, lower than those of the hooking systems of known type, able to guarantee in any case and effectively a removable hooking system for removably hooking a product support element to a closed loop conveyor means.

The above-mentioned advantages are obtained according to the contents of the claims.

BRIEF DESCRIPTION OF THE DRAWINGS

The characteristics of preferred, but not exclusive, embodiments of the hooking system of the present invention will be described in the following description with reference to the appended tables of drawings, in which.

DESCRIPTION OF THE PREFERRED EMBODIMENTS

Figure 1A:
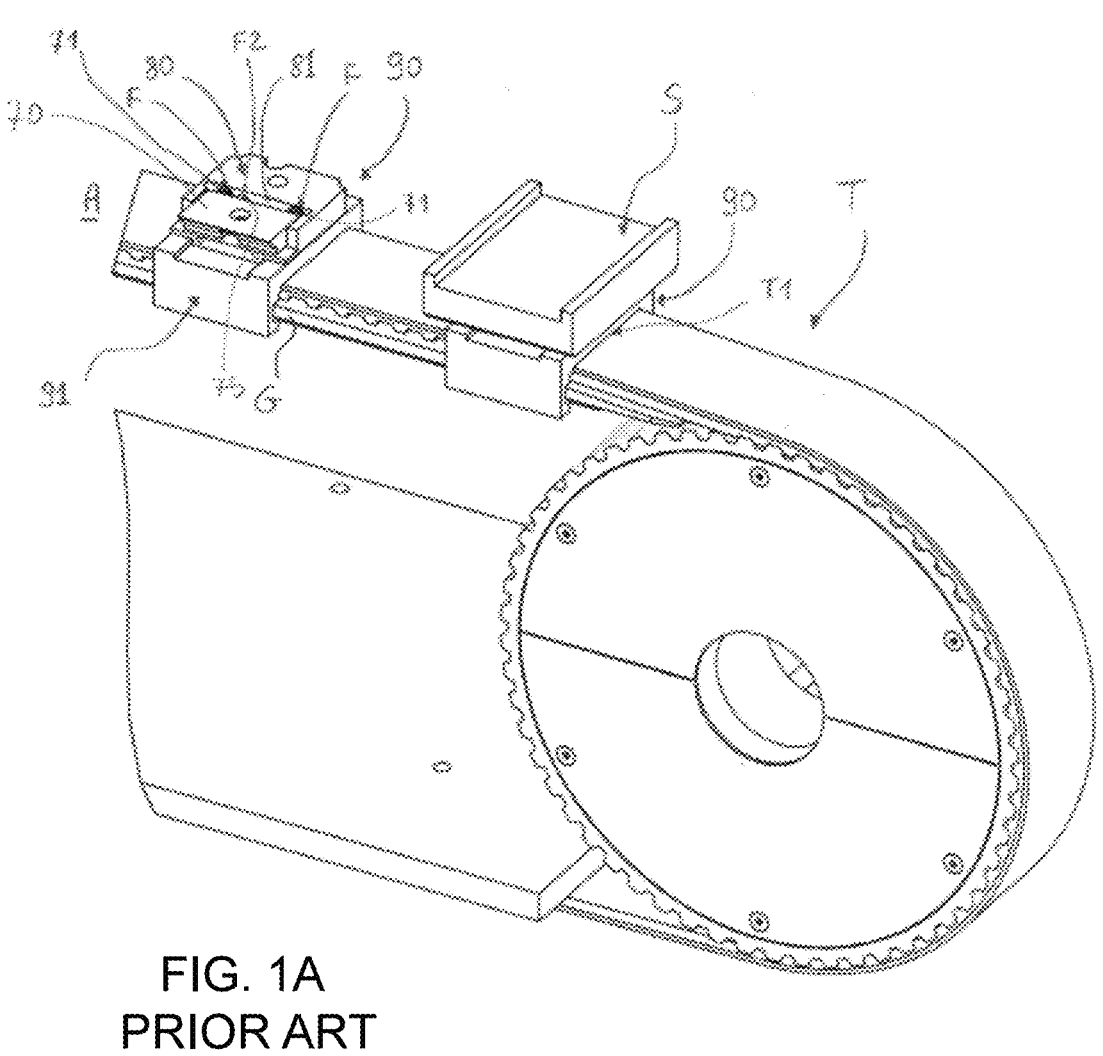
FIG. 1A, mentioned in the foregoing, illustrates, in a partial schematic and perspective view, a closed loop conveyor means, being a cogged belt, on which product support element is mounted by means of the hooking system of the prior art, described in the foregoing.
Figure 1B:
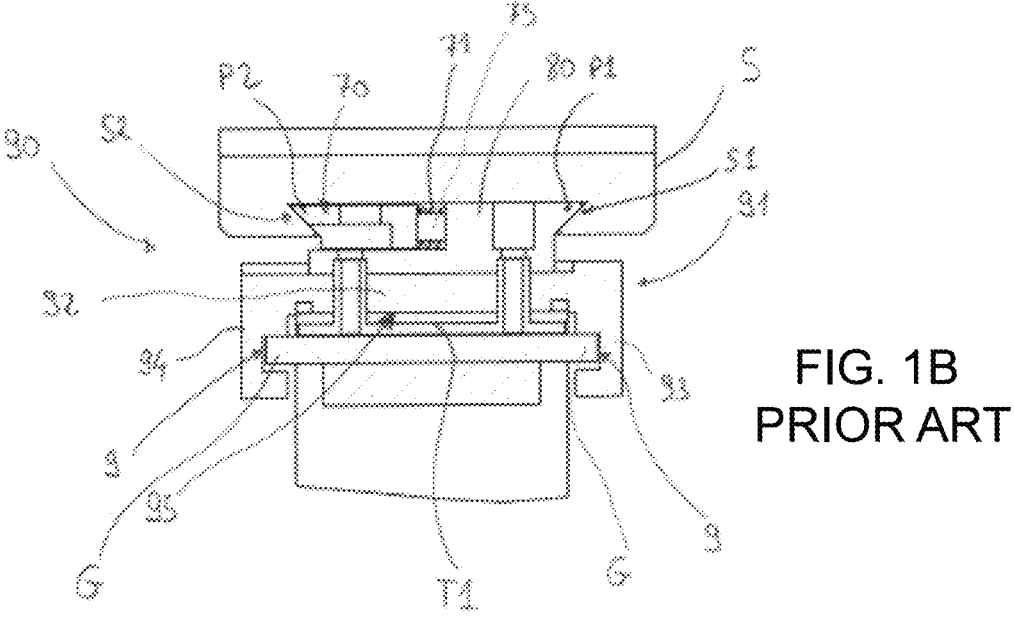
FIG. 1B, also mentioned in the foregoing, is a view in vertical transversal section made at the support element mounted on the closed loop conveyor means of FIG. 1A by means of the hooking system of the prior art, described in the foregoing.
Figure 2:
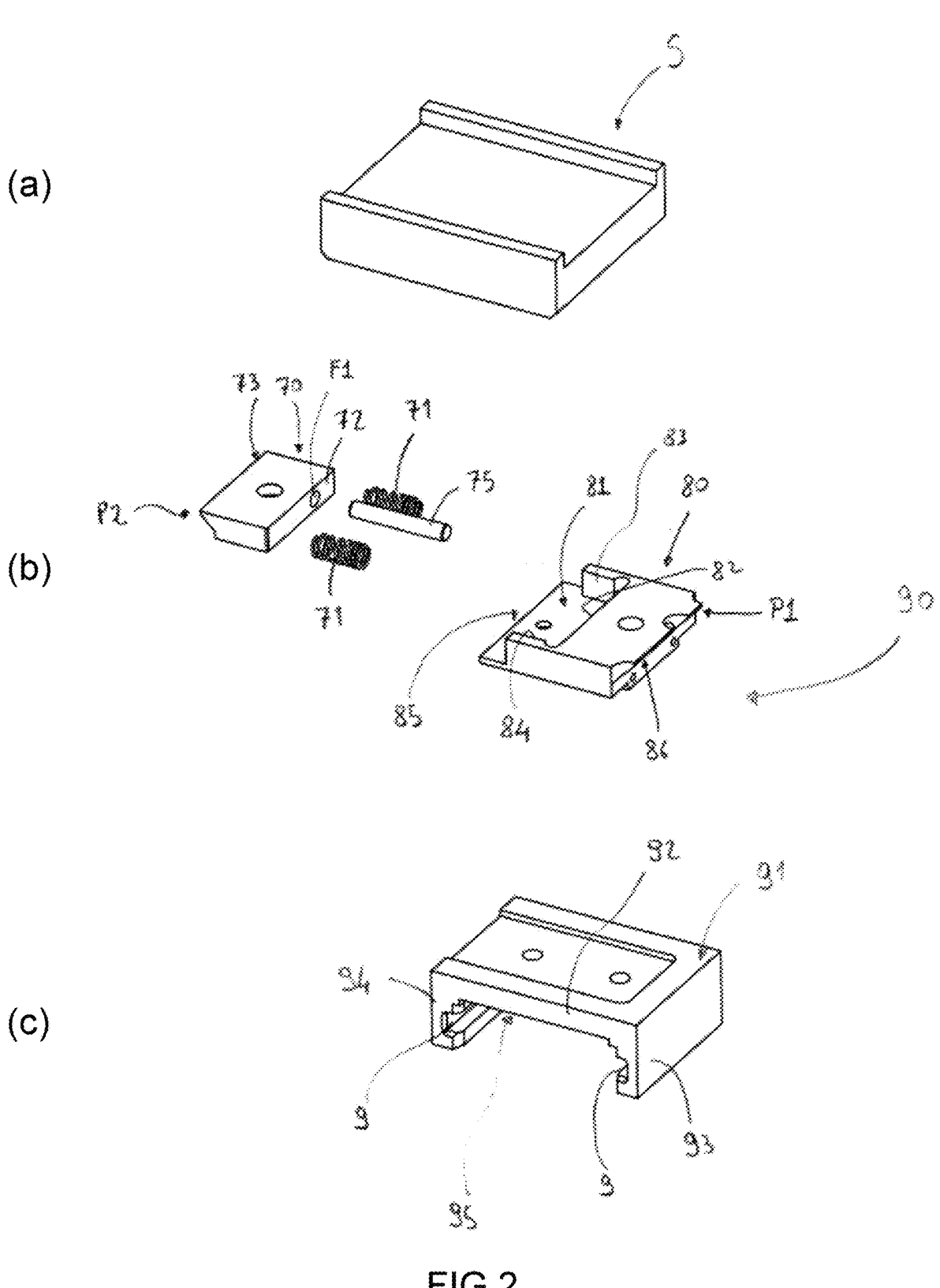
FIG. 2 shows, in a schematic perspective view, exploded, the components of the hooking system of the prior art described in the foregoing.

With reference to the appended tables of drawings, in particular to figures from 3 to 8, reference numeral (100) denotes the removable hooking system of a product support element (E) to a closed loop conveyor means (A), object of the present invention, in its entirety.

Figures 6, 7, 8:
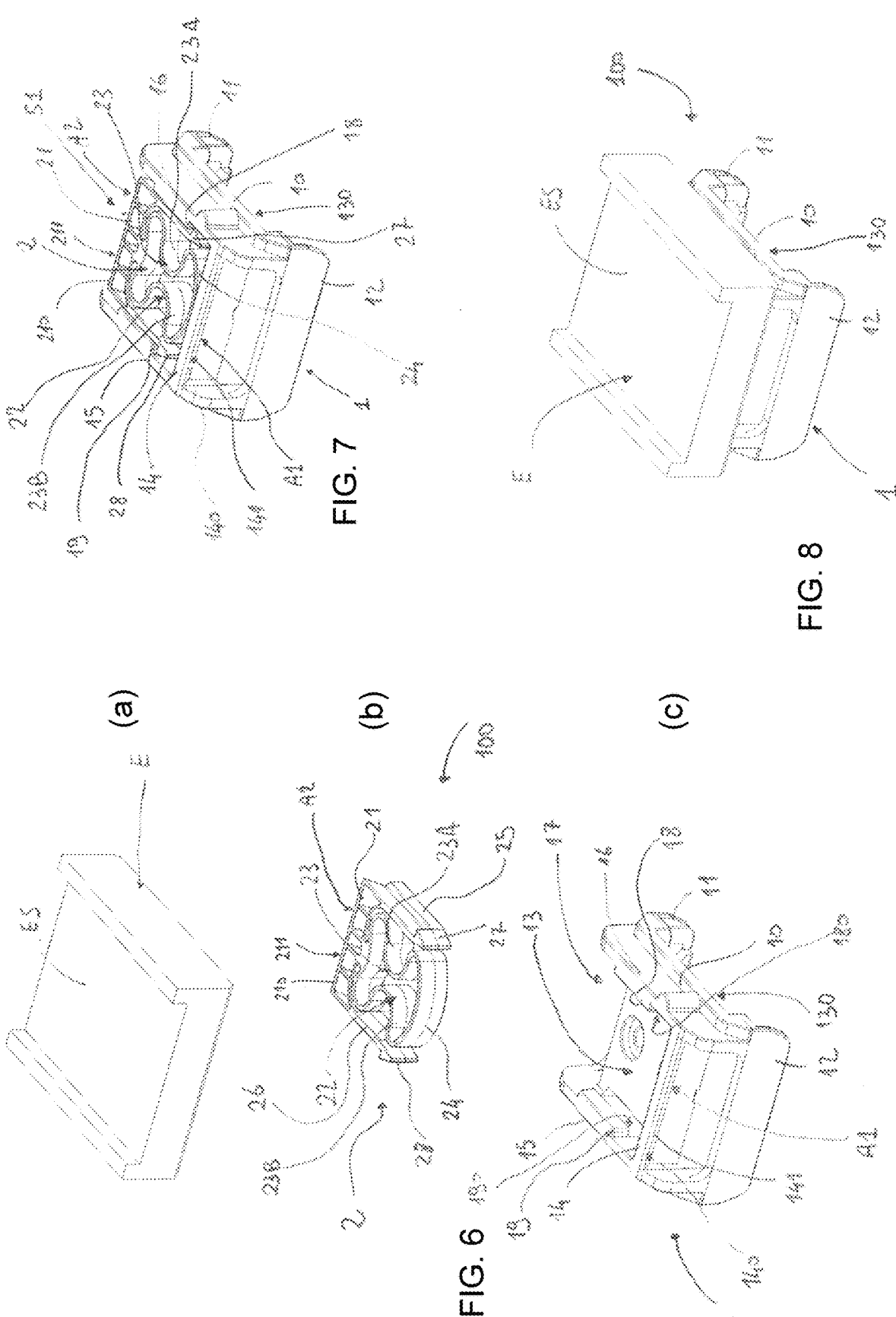
FIG. 6 illustrates, in a schematic perspective view, exploded, the components of the hooking system of the invention.
FIG. 7 illustrates, in a schematic perspective view, the significant components of the hooking system of the invention coupled to one another.
FIG. 8 illustrates, in a schematic and perspective view, the support element hooked to the hooking system of the invention.

The hooking system (100) of the present invention comprises only three elements, being: a base component (1), for fixing to a portion (P) of a closed loop conveyor means (A), a product support element (E), which is to be hooked to the base component (1), and a single hooking component (2) couplable to the base component (1) and which enables the removable hooking of the support element (E) on the base component (1) (the three elements of the hooking system of the invention are visible separate from one another in FIG. 6).

The base component (1) is conformed in such a way as to have a U-shape comprising a main body (10) and two lateral arms (11, 12) which laterally and inferiorly project with respect to the main body (10).

Figures 3, 4, 5:
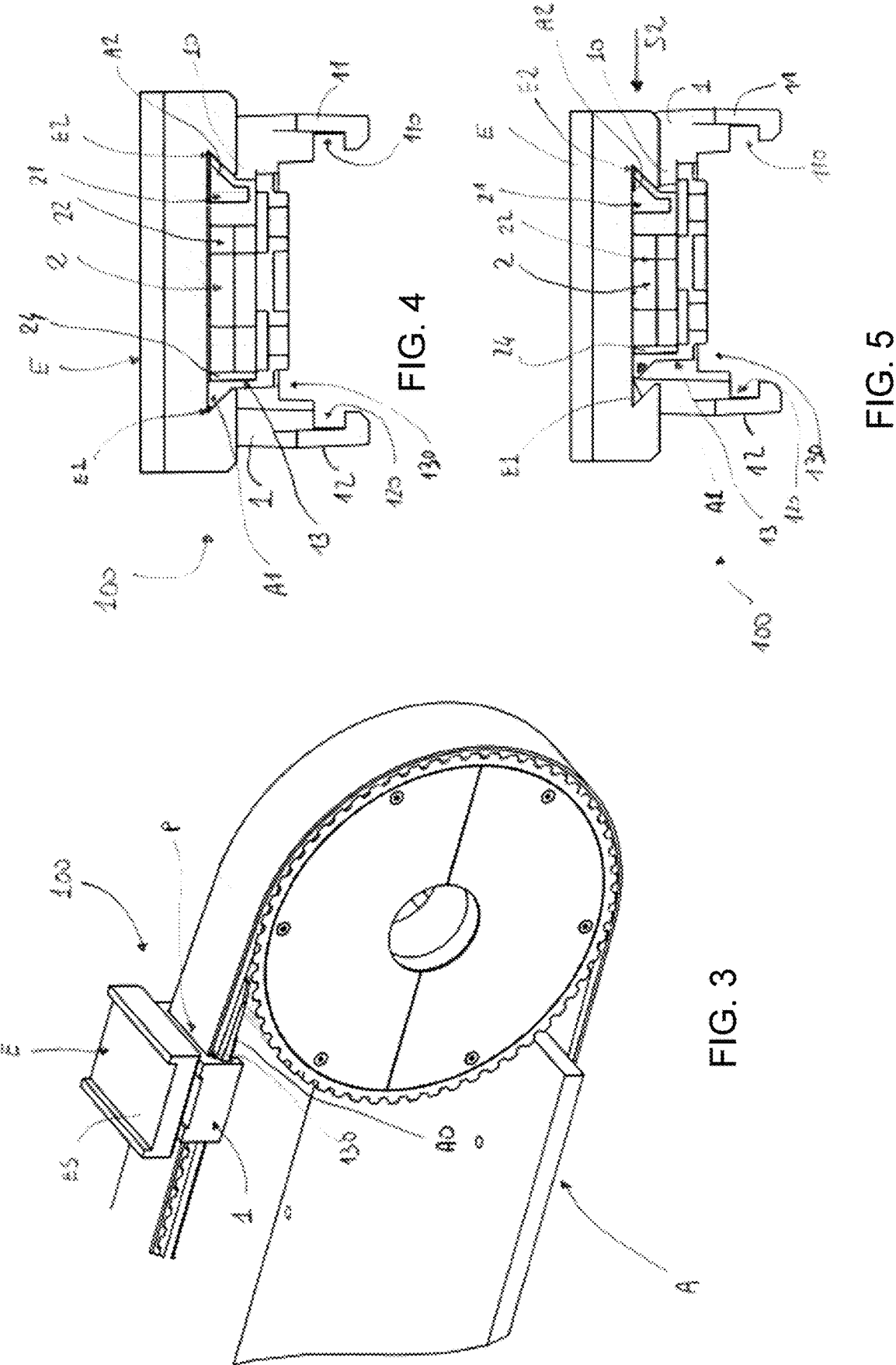
FIG. 3 illustrates, in a partial schematic and perspective view, a closed loop conveyor means, being a cogged belt, on which a product support element is mounted by means of the removable hooking system of the invention.
FIG. 4 is a view in vertical transversal section made at the support element mounted on the conveyor means of FIG. 3 by means of the hooking system of the invention, in which the hooking system is in a first hooking configuration, for the hooking of the support element.
FIG. 5 is again a view in vertical transversal section made at the support element mounted on the conveyor means of FIG. 3 by means of the hooking system of the invention, in which the hooking system is in a second unhooked configuration, for the unhooking of the support element.

The main body (10) is conformed in such a way as to have, inferiorly and between the two lateral arms (11, 12), a housing (130) which is dimensioned so as to be able to house and receive internally thereof a portion (P) of a closed loop conveyor means (A), such as for example a cogged belt, and to enable the base component (1) to be positioned and fixed on the portion (P) of the closed loop conveyor means (A), for example using screws or bolts insertable into holes present in the portion (P) of the conveyor means (A) (see for example FIGS. 3, 4 and 5).

The product support element (E), destined to be hooked to the base component (1) for positioning thereof on the closed loop conveyor means (A), the product support element (E) being superiorly conformed in such a way as to comprise a support and positioning location (ES) of a product, and, inferiorly, in such a way as to comprise a first recess (E1) and a second recess (E2), opposite and parallel to one another.

The main body (10) of the base component (1) is realised in such a way as to comprise, superiorly, a seat (13) delimited by a transversal wall (14) and by two longitudinal walls (15, 16) and having an open side (17) opposite the transversal wall (14), with the transversal wall (14) being conformed in such a way as to comprise a respective edge (140) having an inclined external portion (141) to form a first coupling profile (A1), having a flared shape complementary to the first recess (E1) present inferiorly of the product support element (E) (see FIG. 6).

The single hooking component (2) which is conformed in such a way as to comprise a first rigid part (21) and a second part (22), in a single body with the first part (21), which is made of an elastically deformable material having a shape memory and having a bent sheet shape comprising at least a central portion (23) that is elastically deformable and a distal contact portion (24) (again, see FIG. 6).

In greater detail, the first part (21) of the single hooking component (2) comprises a respective edge (210) which is conformed in such a way as to have a respective inclined external portion (211) to form a second coupling profile (A2), having a flared shape that is complementary to the second recess (E2) present inferiorly of the product support element (E).

Further, the single hooking component (2) is dimensioned and conformed in such a way as to be insertable and positionable, through the open side (17) of the seat (13), in the seat (13) of the base component (1) in such a way that the elastically deformable central portion (23) of the second part (22) is at the seat (13) and the distal contact portion (24) of the second part (22) is in contact with and in abutment against the transversal wall (14) of the seat (13) and the first part (21) is positioned at the open side (17) of the seat (13) (see for example FIG. 7).

Further, the elastically deformable central portion (23) of the second part (22) of the single hooking component (2) is dimensioned in such a way that, when the single hooking component (2) is positioned in the seat (13) of the base component (1) with the distal contact portion (24) of the second part (22) in contact with and in abutment against the transversal wall (14) of the seat (13), the second coupling profile (A2), defined by the inclined external portion (211) of the edge (210) of the first part (21) of the single hooking component (2), is at a first distance from the first coupling profile (A1), defined by the inclined external portion (141) of the edge (140) of the transversal wall (14) of the seat (13) of the base component (1), which is greater than the distance between the first recess (E1) and the second recess (E2) present inferiorly of the product support element (E).

Owing to the special conformation of the single hooking component (2), described in the foregoing, the hooking system (100) of the invention enables carrying out, in a simple and effective way, using only this single component, the hooking and unhooking of the support element (E) to/from the base component (1) in the following ways.

In fact, the hooking system (100) is configured in such a way that, by exerting a first pushing action (S1) on the first portion (21) of the single hooking component (2) towards the transversal wall (14) of the seat (13) of the base component (1) (see FIG. 7), the elastically deformable central portion (23) of the second part (22) of the single hooking component (2) is elastically compressed enabling the second coupling profile (A2) to near the first coupling profile (A1) and to be positioned at a second distance from the first coupling profile (A1) which is less than the distance between the first recess (E1) and the second recess (E2) present in the product support element (E).

In this way, therefore, it is possible to position the product support element (E) above, and laterally to, the base component (1) and to the single hooking component (2) by coupling an initial part of the first recess (E1) with a respective initial part of the first coupling profile (A1) of the base component (1), and then, by terminating the first pushing action (S1) on the first portion (21) of the single hooking component (2), the elastically deformable central portion (23) of the second part (22) of the single hooking component (2) can elastically return towards the initial shape thereof pushing the second coupling profile (A2) of the first portion (21) to couple with the second recess (E2) present in the product support element (E) (see for example FIG. 4), realising the hooking of the product support element (E) to the base component (1), and thus to the closed loop conveyor means (A).

The modes for carrying out the unhooking of the support element (E) on the base component (1) are also very simple and immediate to carry out.

In fact, by exerting a second pushing action (S2) on the product support element (E) to push the first part (21) with the second coupling profile (A2) of the single hooking component (2) towards the transversal wall (14) of the seat (13) of the base component (1) (see for example FIG. 5), the elastically deformable central portion (23) of the second part (22) of the single hooking component (2) is elastically compressed enabling translation of the product support element (E) with respect to the base component (1) and thus the disengaging of the first recess (E1) from the first coupling profile (A1) for the unhooking of the product support element (E) from the base component (1) and thus from the closed loop conveyor means (A).

Therefore, definitively, the hooking system of the invention enables hooking and unhooking a product support element to and from a closed loop conveyor means, such as for example a cogged belt, in a simple and immediate way, using a small number of elements, and fewer than in the known hooking systems.

In substance, then, as well as the base component and the support element, which are substantially also present in the hooking systems of the prior-art, in the hooking system of the invention only one further component is used, i.e. the single hooking component which, owing to the particular conformation thereof, and to the ability thereof to deform elastically and to the shape memory thereof, can be arranged in the seat of the base component and enable hooking (and unhooking) the support element to the base component.

Further advantageous aspects of the hooking system proposed by the present invention are described in the following.

In a second preferred aspect, the elastically deformable central portion (23) of the second part (22) of the single hooking component (2) is conformed in such a way as to comprise two laminar semi-parts (23A; 23B) each being S-shaped which are joined to one another by the distal contact portion (24) of the second part (22) of the single hooking component (2).

In particular, the elastically deformable central portion (23) of the second part (22) of the single hooking component (2) is made of an elastically deformable plastic material having a shape memory, for example made of a polymeric material, such as polyamide of various grades, for example Nylon, or of acetyl resins, possibly loaded, such as for example Delrin/Pom-C.

In a further preferred aspect, the single hooking component (2) is made in such a way as to comprise, externally at both sides of the elastically deformable central portion (23), a pair of abutment walls (25, 26), in a single body with the first part (21) of the single hooking component (2), while the longitudinal walls (15, 16) of the seat (13) of the base component (1) each comprise protuberances (18, 19) defining, between them and the base of the seat (30), respective guide channels (180, 190) for guiding the abutment walls (25, 26) of the single hooking component (2) when the single hooking component (2) is inserted and positioned in the seat (13).

Further, the pair of abutment walls (25, 26) of the single hooking component (2) comprise, at the respective ends, hook-shaped elements (27, 28), while the protuberances (18, 19) of the longitudinal walls (15, 16) of the seat (13) of the base component (1) are conformed in such a way as to form an abutment such as to couple with the hook-shaped elements (27, 28) of the abutment walls (25, 26) in such a way as to maintain the single hooking component (2) in the seat (13) of the base component (1) once the single hooking component (2) is inserted and positioned in the seat (13).

The internal walls of the two lateral arms (11, 12) of the base component (1) are conformed in such a way as to comprise respective grooves (110, 120) having a suitable shape for coupling with sliding guides (A0) present in the closed loop conveyor means (A) for guiding and maintaining the base component (1) and therefore the product support element (E) stable during the activation of the closed loop conveyor means (A).

The invention claimed is:

1. A removable hooking system of a product support element to a closed loop conveyor means, comprising:
   a base component which is conformed in such a way as to have a U-shape comprising a main body and two lateral arms which laterally and inferiorly project with respect to the main body, the main body is conformed in such a way as to have, inferiorly and between the two lateral arms, a housing which is dimensioned so as to be able to house and receive internally thereof a portion of a closed loop conveyor means and enable the base component to be positioned and fixed on the portion of the closed loop conveyor means;
   a product support element, destined to be hooked to the base component for positioning thereof on the closed loop conveyor means, the product support element being superiorly conformed in such a way as to comprise a support and positioning location of a product, and, inferiorly, in such a way as to comprise a first recess and a second recess, opposite and parallel to one another;
   characterised in that the main body of the base component is realised in such a way as to comprise, superiorly, a seat delimited by a transversal wall and by two longitudinal walls and having an open side opposite the transversal wall, and wherein the transversal wall is conformed in such a way as to comprise a respective edge having an inclined external portion to form a first coupling profile, having a flared shape complementary to the first recess present inferiorly of the product support element;
   and in that it comprises a single hooking component which is conformed in such a way as to comprise a first rigid part and a second part, in a single body with the first part, which is made of an elastically deformable material having a shape memory and having a bent sheet shape comprising at least a central portion that is elastically deformable and a distal contact portion,
   wherein the first part of the single hooking component comprises a respective edge which is conformed in such a way as to have a respective inclined external portion to form a second coupling profile, having a flared shape that is complementary to the second recess present inferiorly of the product support element,
   wherein the single hooking component is dimensioned and conformed in such a way as to be insertable and positionable, through the open side of the seat, in the seat of the base component in such a way that the elastically deformable central portion of the second part is at the seat and the distal contact portion of the second part is in contact with and abutment against the transversal wall of the seat and the first part is positioned at the open side of the seat, wherein the elastically deformable central portion of the second part of the single hooking component is dimensioned in such a way that, when the single hooking component is positioned in the seat of the base component with the distal contact portion of the second part in contact with and in abutment against the transversal wall of the seat, the second coupling profile, defined by the inclined external portion of the edge of the first part of the single hooking component, is at a first distance from the first coupling profile, defined by the inclined external portion of the edge of the transversal wall of the seat of the base component, which is greater than the distance between the first recess and the second recess present inferiorly of the product support element;
   wherein the hooking system is configured in such a way that, by exerting a first pushing action on the first portion of the single hooking component towards the transversal wall of the seat of the base component, the elastically deformable central portion of the second part of the single hooking component is elastically compressed enabling the second coupling profile to near the first coupling profile and to be positioned at a second distance from the first coupling profile which is less than the distance between the first recess and the second recess present in the product support element, thus enabling to position the product support element above, and laterally to, the base component and to the single hooking component by coupling an initial part of the first recess with a respective initial part of the first coupling profile of the base component, and then, by terminating the first pushing action on the first portion of the single hooking component, the elastically deformable central portion of the second part of the single hooking component can elastically return towards the initial shape thereof pushing the second coupling profile of the first portion to couple with the second recess present in the product support element, realising the hooking of the product support element to the base component, and thus to the closed loop conveyor means, and the hooking system is configured so that, thereafter, by exerting a second pushing action on the product support element to push the first part with the second coupling profile of the single hooking component towards the transversal wall of the seat of the base component, the elastically deformable central portion of the second part of the single hooking component is elastically compressed enabling translation of the product support element with respect to the base component and thus the disengaging of the first recess from the first coupling profile for the unhooking of the product support element from the base component and thus from the closed loop conveyor means.

2. The hooking system as claimed in claim 1, wherein the elastically deformable central portion of the second part of the single hooking component is conformed in such a way as to comprise two laminar semi-parts each being S-shaped which are joined to one another by the distal contact portion of the second part of the single hooking component.

3. The hooking system as claimed in claim 1, wherein the elastically deformable central portion of the second part of the single hooking component is made of an elastically deformable plastic material having a shape memory, pref-erably of a polymeric material, such as polyamide of various grades, or of acetal resin, possibly loaded.

4. The hooking system as claimed in claim 1, wherein the single hooking component is made in such a way as to comprise, externally at both sides of the elastically deform-able central portion, a pair of abutment walls, in a single body with the first part of the single hooking component, and wherein the longitudinal walls of the seat of the base component each comprise protuberances defining, between them and the base of the seat, respective guide channels for guiding the abutment walls of the single hooking component when the single hooking component is inserted and posi-tioned in the seat.

5. The hooking system as claimed in claim 4, wherein the pair of abutment walls of the single hooking component comprise, at the respective ends, hook-shaped elements, and wherein the protuberances of the longitudinal walls of the seat of the base component are conformed in such a way as to form an abutment such as to couple with the hook-shaped elements of the abutment walls in such a way as to maintain the single hooking component in the seat of the base component once the single hooking component is inserted and positioned in the seat.

6. The hooking system as claimed in claim 1, wherein the internal walls of the two lateral arms of the base component are conformed in such a way as to comprise respective grooves having a suitable shape for coupling with sliding guides present in the closed loop conveyor means for guiding and maintaining the base component and therefore the product support element stable during the activation of the closed loop conveyor means.

* * * * *